(12) United States Patent  
Oshikiri et al.

(10) Patent No.: US 8,045,620 B2  
(45) Date of Patent: Oct. 25, 2011

(54) IMAGE PROCESSING APPARATUS, IMAGE PROCESSING METHOD AND COMPUTER READABLE MEDIUM

(75) Inventors: Makoto Oshikiri, Akishima (JP); Tatsuro Fujisawa, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 241 days.

(21) Appl. No.: 12/574,473

(22) Filed: Oct. 6, 2009

(65) Prior Publication Data

US 2010/0157162 A1 Jun. 24, 2010

(30) Foreign Application Priority Data

Dec. 22, 2008 (JP) ................................ 2008-326109

(51) Int. Cl.  
*H04N 7/12* (2006.01)

(52) U.S. Cl. .................... 375/240.16; 375/240.12

(58) Field of Classification Search .............. 375/240, 375/240.01, 240.12, 240.16  
See application file for complete search history.

(56) References Cited

U.S. PATENT DOCUMENTS

| | | | |
|---|---|---|---|
| 6,327,391 | B1 | 12/2001 | Ohnishi et al. |
| 6,574,370 | B1 | 6/2003 | Kazayama et al. |
| 7,586,540 | B2 | 9/2009 | Ogino et al. |
| 2005/0276328 | A1 | 12/2005 | Sakamoto |
| 2006/0004568 | A1 | 1/2006 | Kondo et al. |
| 2006/0092321 | A1 | 5/2006 | Ogino et al. |
| 2008/0129862 | A1 | 6/2008 | Hamada et al. |
| 2008/0170161 | A1 | 7/2008 | Ogino et al. |

FOREIGN PATENT DOCUMENTS

| | | |
|---|---|---|
| JP | 5161198 | 6/1993 |
| JP | 7013586 | 1/1995 |
| JP | 7064598 | 3/1995 |
| JP | 07-99651 | 4/1995 |
| JP | 09-121355 | 5/1997 |
| JP | 3544473 | 7/2004 |
| JP | 2005-203981 | 7/2005 |
| JP | 2005-354528 | 12/2005 |
| JP | 2006-017940 | 1/2006 |
| JP | 3745425 | 2/2006 |
| JP | 2006-129181 | 5/2006 |
| JP | 2008-141546 | 6/2006 |
| JP | 2006-352611 | 12/2006 |
| JP | 2008-167102 | 7/2008 |
| WO | WO 0005899 | 2/2000 |

*Primary Examiner* — Allen Wong  
(74) *Attorney, Agent, or Firm* — Blakely, Sokoloff, Taylor & Zafman LLP (57) ABSTRACT

According to one embodiment, an image processing apparatus includes a vector calculation module, a major vector detection module, and an interpolation frame generation module. The vector calculation module calculates motion vectors of pixel blocks of a frame of moving picture data. The major vector detection module detects as a major vector, motion vectors with the same direction and the same magnitude which have the ratio of the number of the motion vectors with the same direction and the same magnitude to the number of the motion vectors of the frame, the ratio being greater than a predetermined value. The interpolation frame generation module generates an interpolation frame inserted between a processing frame and a preceding frame preceding the processing frame. The motion vector calculation module calculates the motion vectors based on the major vector corresponding to the preceding frame.

10 Claims, 7 Drawing Sheets

IMAGE PROCESSING APPARATUS, IMAGE PROCESSING METHOD AND COMPUTER READABLE MEDIUM

CROSS-REFERENCE TO RELATED APPLICATIONS

This application is based upon and claims the benefit of priority from prior Japanese Patent Application No. 2008-326109, filed Dec. 22, 2008, the entire contents of which are incorporated herein by reference.

BACKGROUND

1. Field

One embodiment of the invention relates to an image processing apparatus, an image processing method and an image processing program, which insert an interpolation frame between frames.

2. Description of the Related Art

Conventionally, in the field of moving picture processing or the like, there have been proposed various techniques for generating an interpolation frame inserted between two temporally successive frames (a preceding frame and a following frame).

For example, in a frame rate conversion apparatus disclosed in Jpn. Pat. Appln. KOKAI Publication No. 2008-141546, in order to generate an interpolation frame, a histogram distribution of motion vectors is generated by detecting motion vectors between preceding and following frame images. Based on the histogram distribution of motion vectors (the distribution of motion vectors), it is determined whether there are a predetermined threshold number or more of motion vectors which exceed a search range. If there are a predetermined threshold number or more of motion vectors which exceed a search range, an interpolation frame is generated by a method which does not use motion vectors. Thereby, degradation in image quality of the interpolation frame can be prevented. Thus, even if a narrow search range is set, degradation in image quality of the interpolation frame can be prevented when there are the predetermined threshold number or more of motion vectors which exceed the search range. Therefore, according to this conventional technique, it is possible to suppress the degradation in image quality of the interpolation frame, while reducing the calculation processing amount in the interpolation frame generation process.

In the technique disclosed in Jpn. Pat. Appln. KOKAI Publication No. 2008-141546, however, no consideration is given to the improvement in precision of motion vectors, which are detected at the time of generating the interpolation frame. In this conventional technique, it is thus difficult to enhance the image quality of the interpolation frame, although it is possible to suppress the degradation in image quality of the interpolation frame, which is caused by motion vectors which exceed the search range.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an image processing apparatus comprises a vector calculation module configured to calculate motion vectors of pixel blocks of a frame of moving picture data; a major vector detection module configured to detect as a major vector, motion vectors with the same direction and the same magnitude which have the ratio of the number of the motion vectors with the same direction and the same magnitude to the number of the motion vectors of the frame, the ratio being greater than a predetermined value; and an interpolation frame generation module configured to generate an interpolation frame inserted between a processing frame and a preceding frame preceding the processing frame, wherein the motion vector calculation module is configured to calculate the motion vectors based on the major vector corresponding to the preceding frame.

Figure 1:
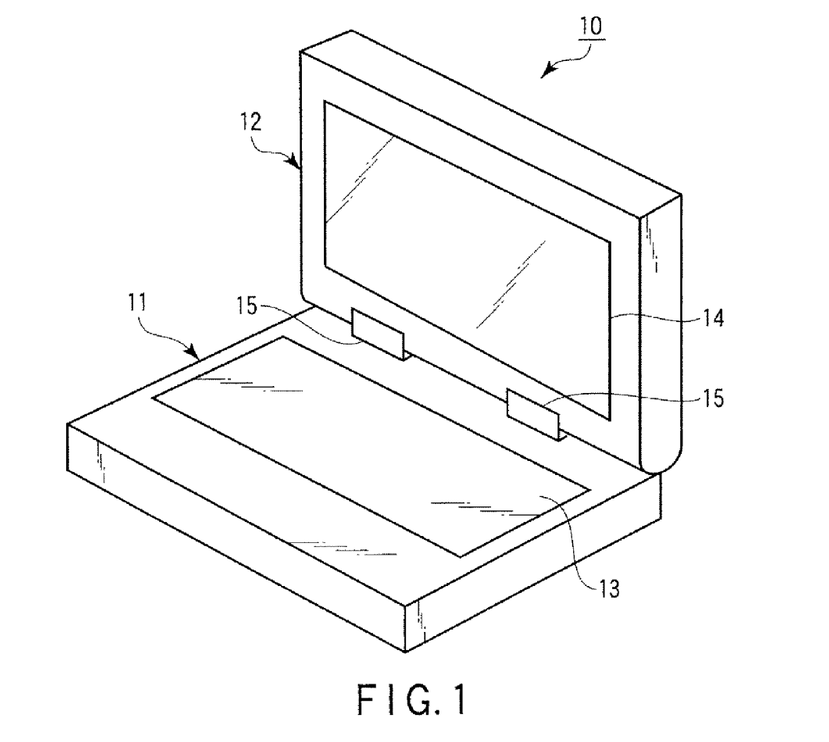
FIG. 1 is an exemplary schematic view showing the external appearance of an embodiment of an image processing apparatus of the present invention.

FIG. 1 is a schematic view showing the external appearance of an embodiment of the image processing apparatus of the present invention. The image processing apparatus of the invention may be realized as a personal computer, a TV receiver or a recording/playback apparatus. FIG. 1 shows a notebook personal computer 10 (hereinafter referred to as "computer 10") as an example of the image processing apparatus of the present invention.

As shown in FIG. 1, the computer 10 comprises a computer main body 11 and a display unit 12 including a display device.

The computer main body 11 has a thin box-shaped housing. An input module 13 is provided on a central part of the upper surface of the housing. The input module 13 comprises, for instance, a keyboard. A palm rest is provided on a front side of the upper surface of the housing of the computer main body 11.

The display unit 12 includes a display panel 14 which is composed of, for example, an LCD (Liquid Crystal Display). The display unit 12 is attached to the computer main body 11 to be pivotal between an open position where the upper face of the computer main body 11 is exposed and a close position where the display unit 12 covers the upper face of the computer main body 11 via coupling portions (hinges) 15.

Figure 2:
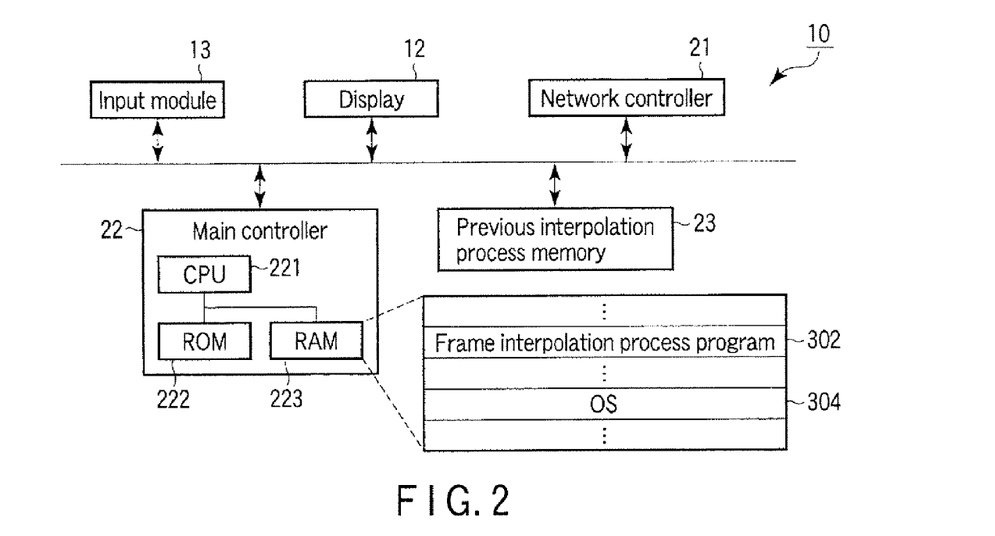
FIG. 2 is an exemplary block diagram showing an example of the internal structure of the image processing apparatus of the embodiment.

FIG. 2 is a block diagram which shows an example of the internal structure of the computer 10.

As shown in FIG. 2, the computer 10 includes the input module 13, the display unit 12, a network controller 21, a main controller 22 and a previous interpolation process memory 23.

The network controller 21 implements various network protocols. The network controller 21 connects the computer 10 to other electronic apparatuses according to the various protocols. The connection can be applied for, for example, electrical connection via a network. The network, in this context, refers to general information communication networks utilizing telecommunications technology. Examples of the network include wireless/wired local area networks (LANs), a telephone communication network, an optical fiber communication network, a cable communication network, and a satellite communication network.

The computer 10 is configured to be capable of processing successive image frames. The image frames are, for example, image frames in moving picture data included in moving picture content that is received by the computer 10 from a Web server on the Internet via the network controller 21.

The main controller 22 is composed of a CPU 221 and memory media such as a RAM 223 and a ROM 222. The main controller 22 controls the respective components in the computer 10, for example, according to programs which are loaded from the ROM 222 into the RAM 223.

The RAM 223 provides a work area for temporarily stores programs and data which are executed by the CPU 221.

The ROM 222 stores a boot program (OS) 301 of the computer 10, a frame interpolation process program 302, and various data that is necessary for executing these programs.

Specifically, the CPU 221 loads the frame interpolation process program 302 and the necessary data for executing this program 302, which are stored in the ROM 222 into the RAM 223. The frame interpolation process program 302 generates, from two input successive image frames, an interpolation frame inserted between these two image frames. According to the frame interpolation process program 302, the CPU 221 executes a process of improving the estimation precision of motion vectors, which are used for generating the interpolation frame, and the image quality of the generated interpolation frame, by using the distribution of motion vectors.

Memory media, such as the ROM 222, includes recording media which are readable by the CPU 221, for instance, magnetic or optical recording media or semiconductor memories. A part or the entirety of the programs and data in these memory media may be downloaded via an electronic network.

Figure 3:
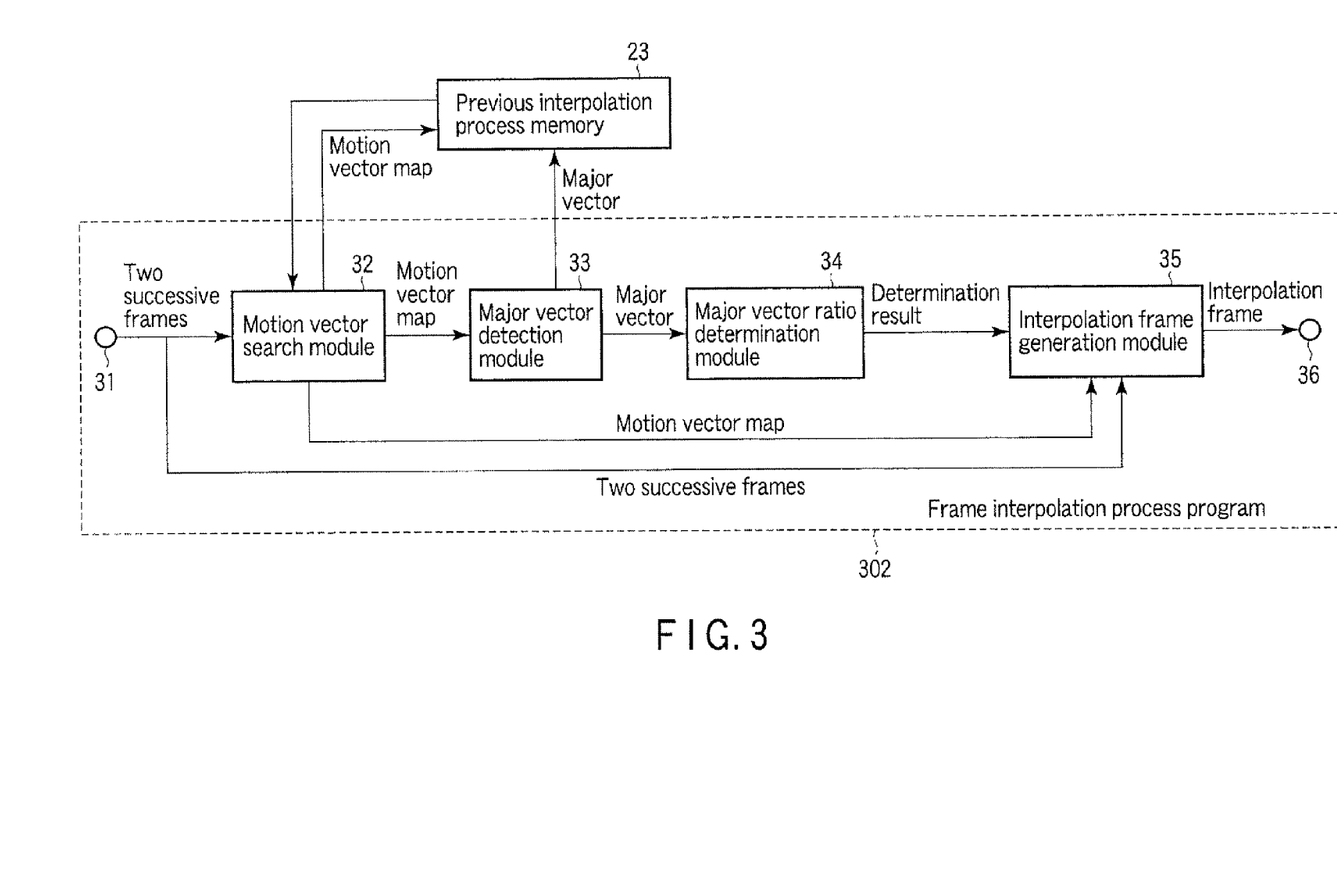
FIG. 3 is an exemplary block diagram showing an example of structure of a frame interpolation process program.

FIG. 3 is a block diagram which shows a structure example of the frame interpolation process program 302. Although the frame interpolation process is provided by the frame interpolation process program 302, the process may be composed not by software, but by a hardware logic such as a circuit.

As shown in FIG. 3, the frame interpolation process program 302 includes a frame input module 31, a motion vector search module 32, a major vector detection module 33, a major vector ratio determination module 34, an interpolation frame generation module 35 and a frame output module 36. These modules 31 to 36 use predetermined work areas in the RAM 223 as temporal storage area.

The frame input module 31 reads image frames from processing moving picture data, and outputs the read image frames to the motion vector search module 32 and interpolation frame generation module 35.

The motion vector search module 32 divides each of successive image frames input from the frame input module 31 into predetermined pixel blocks (e.g. 8 pixels×8 pixels), and executes a motion vector search with respect to each pixel block. As the method of the motion vector search, there are known various methods such as block matching, and an arbitrary method may be used. The pixel block may be composed of only one pixel. In this case, the motion vector search module 32 executes the motion vector search with respect to each pixel.

The description below is given of an example in which the motion vector search module 32 is supplied with two successive image frames. The motion vector search module 32 executes a motion vector search by successively scanning the pixel blocks by a so-called raster scanning (for example, a motion vector search is executed successively from the upper left pixel block to the upper right pixel block in the image frame, then a motion vector search is executed from the left end pixel block in the second row, and at last a motion vector search is executed on the lower right pixel block). Thereby, the motion vector search module 32 outputs a map of motion vectors (hereinafter referred to as "motion vector map"), in which motion vectors of the respective pixel blocks are disposed on the image frame.

The motion vector search module 32 outputs the information of the motion vector map to the major vector detection module 33, the interpolation frame generation module 35 and the previous interpolation process memory 23. The previous interpolation process memory 23 stores the information of the motion vector map.

Figure 4:
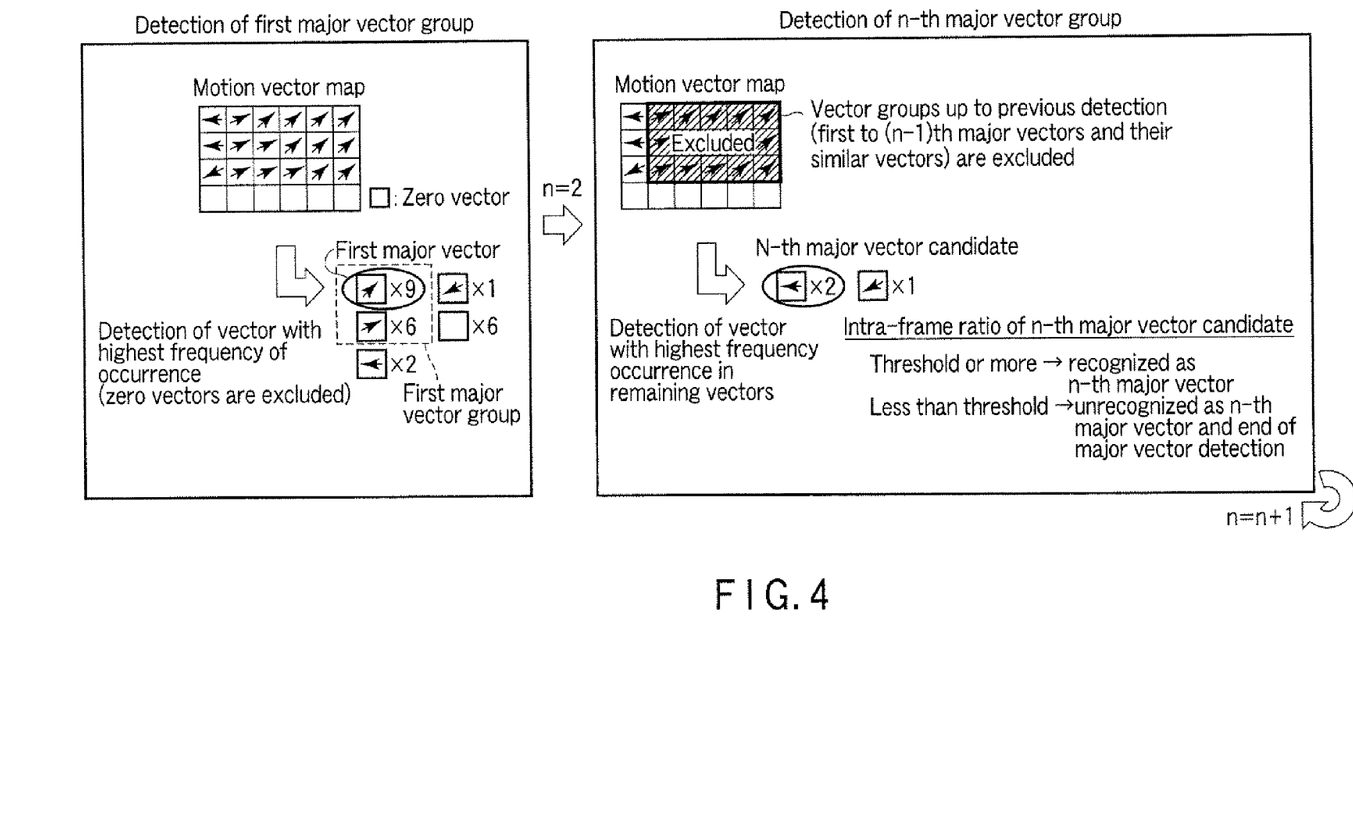
FIG. 4 is an exemplary view showing an example of detecting major vectors by a major vector detection module.

FIG. 4 shows an example of major vector detection by the major vector detection module 33.

The major vector detection module 33 detects a major vector based on the motion vector map. Specifically, the major vector detection module 33 first detects, as a first major vector $mv_p$, motion vectors with the same direction and the same magnitude which have the ratio of the number of pixel blocks corresponding to the motion vectors with the same direction and the same magnitude to the number of pixel blocks included in one frame, the ratio being the highest (see a left part of FIG. 4). In other words, the major vector detection module 33 detects, as the first major vector $mv_p$, motion vectors with the same direction and the same magnitude which have the ratio of the number of the motion vectors to the number of motion vectors which constitute the motion vector map, the ratio being the highest.

Subsequently, the major vector detection module 33 extracts a first major vector group including the first major vector $mv_p$ and a motion vector or vectors (hereinafter referred to as "similar motion vector or vectors") having a predetermined correlation value or more with the first major vector $mv_p$. Specifically, a similar motion vector or vectors, whose absolute value of a difference from the first major vector $mv_p$ is not higher than a threshold $Th_a$ (e.g. the length in one pixel), and the first major vector $mv_p$, are extracted together as the first major vector group. For example, a motion vector $mv_a$ in the motion vector map is classified into the first major vector group if the motion vector $mv_a$ satisfies the following formula:

$$|mv_{ax}-mv_{px}|+|mv_{ay}-mv_{py}| \leq Th_a$$

where $mv_{px}$ is a horizontal component of the first major vector $mv_p$, $mv_{py}$ is a vertical component of the first major vector $mv_p$, $mv_{ax}$ is a horizontal component of the first major vector $mv_a$, and $mv_{ay}$ is a vertical component of the first major vector $mv_a$.

Next, the major vector detection module 33 detects, as a second major vector, motion vectors excluding the first major vector group and having the same direction and the same magnitude which have the ratio of the number of pixel blocks corresponding to the motion vectors with the same direction and the same magnitude to the number of pixel blocks of one frame, the ratio being the highest higher than a first ratio (e.g. 0.05). In addition, like the case of the first major vector, a second major vector group is extracted.

By repeating the above-described procedure, the major vector detection module 33 extracts one or more major vectors including the first major vector (first to n-th major vectors: n is a natural number), and vector groups (first to n-th major vector groups) corresponding to the respective major vectors (see a right part of FIG. 4). Note that the major vector is not a zero vector.

In addition, the major vector detection module 33 classifies the motion vectors into three groups. Specifically, the major vector detection module 33 classifies the motion vector, which constitute the motion vector map, into a major vector group comprising first to j-th major vector groups (j is a natural number; $j \leq n$); a non-major vector group comprising motion vectors which are not zero vectors and do not belong to the major vector groups; and a static vector group comprising motion vectors that are zero vectors.

The major vector group may comprise only the first major vector group, or may comprise the first major vector group and the second major vector group, or may comprise the first major vector group, the second major vector group, and other major vector groups, for instance, a third major vector group and a fourth major vector group.

The major vector detection module 33 outputs information relating to the above-described major vectors and major vector groups to the major vector ratio determination module 34 and the previous interpolation process memory 23.

Figure 5:
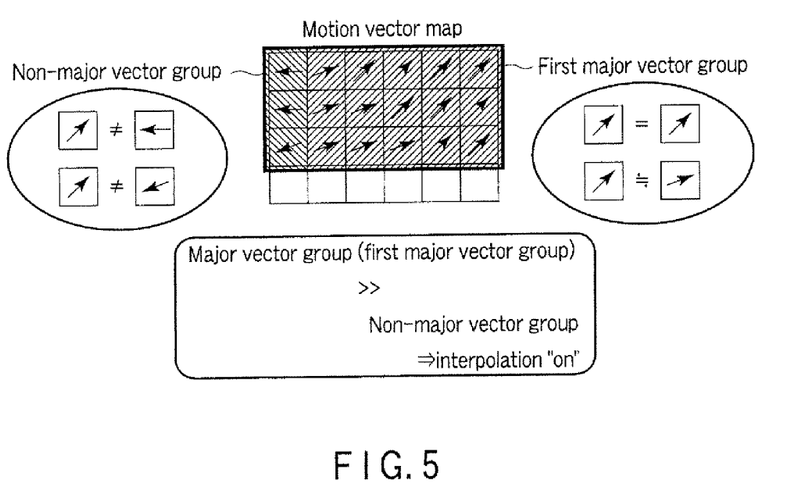
FIG. 5 is an exemplary view showing an example of determining an interpolation frame generation method by a major vector ratio determination module.

FIG. 5 shows an example of determining the method of interpolation frame generation by the major vector ratio determination module 34. FIG. 5 shows the case in which the major vector group comprises only the first major vector group.

The major vector ratio determination module 34 determines the interpolation frame generation method based on whether the ratio (hereinafter referred to as "major vector group ratio") of the number of motion vectors constituting the major vector group to the number of motion vectors constituting the major vector group and non-major vector group is greater than or equal to a second ratio (e.g. 0.5). Specifically, if the major vector group ratio is greater than or equal to the second ratio (e.g. 0.5), the major vector ratio determination module 34 determines, as the interpolation frame generation method executed by the interpolation frame generation module 35, a method (first method) in which an interpolation frame inserted between two input image frames is generated by using motion compensation based on the motion vector map which is input from the motion vector search module 32. On the other hand, if the major vector group ratio is less than the second ratio, the major vector ratio determination module 34 determines, as the interpolation frame generation method executed by the interpolation frame generation module 35, a method (second method) which executes one of a process in which an interpolation frame is generated by copying any one of input frames, a process in which an interpolation frame is generated by averaging pixel values of two input frames, and a process in which no interpolation frame is generated.

The major vector ratio determination module 34 outputs information indicative of the determined interpolation frame generation method to the interpolation frame generation module 35.

The interpolation frame generation module 35 generates an interpolation frame inserted between frames, based on the interpolation frame generation method determined by the major vector ratio determination module 34. Accordingly, when the interpolation frame generation method is determined to be the first method, the interpolation frame generation module 35 generates an interpolation frame inserted between two input image frames by executing motion compensation based on the motion vector map which is input from the motion vector search module 32. On the other hand, when the interpolation frame generation method is determined to be the second method, the interpolation frame generation module 35 executes one of the process in which an interpolation frame is generated by copying any one of input frames, the process in which an interpolation frame is generated by averaging pixel values of two input frames, and the process in which no interpolation frame is generated.

Figure 6:
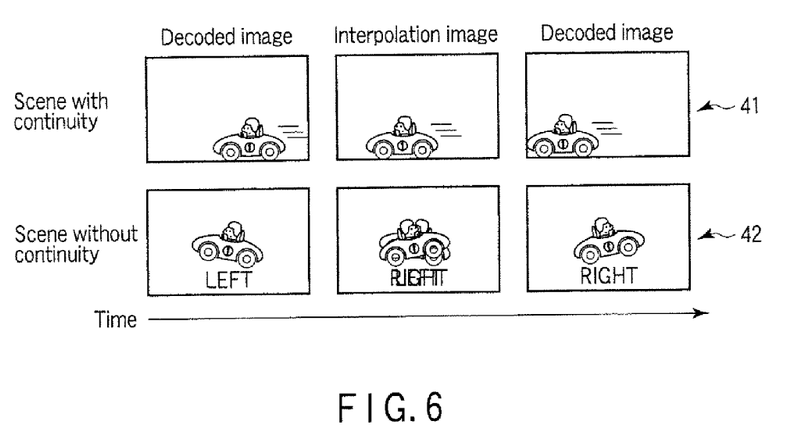
FIG. 6 is an exemplary view showing characteristics of interpolation frames.

Referring to FIG. 6, a description is given of the validity of switching the interpolation frame generation method by the interpolation frame generation module 35 based on the determination by the major vector ratio determination module 34.

If an interpolation frame inserted between frames with continuous motion is generated in a continuous scene 41, the frame interpolation technique is effective in that a smooth moving picture is displayed by this interpolation frame. On the other hand, if an interpolation frame inserted between frames with no continuous motion is generated in a non-continuous scene 42 (e.g. a scene including a scene change), the possibility is high that image warping occurs in the interpolation frame because of a motion estimation error. In addition, even if an interpolation frame is inserted between frames with no continuous motion, the visual effect is not high. Thus, only if there is a dominant motion in a frame, for which a high visual effect is obtained by frame interpolation, that is, only if there is continuity between frames, frame interpolation is executed based on motion compensation using motion vectors. Therefore, if the visual effect of frame interpolation is low, the frame interpolation based on the motion compensation may not be executed, and the amount of processing can be reduced.

As has been described above, the major vector ratio determination module 34 calculates the major vector group ratio. For example, if the major vector group comprises only the first major vector group and the major vector group ratio is greater than or equal to the second ratio, there is one dominant motion in the frame. In addition, if the major vector group comprises the first major vector group and second major vector group, and the major vector group ratio is greater than or equal to the second ratio, there are two dominant motions in the frame. Thus, the major vector group ratio can be used as the ratio of an area with high visual effect of the frame interpolation based on motion compensation.

By using the determination by the major vector ratio determination module 34 (the determination as to whether the major vector group ratio is greater than or equal to the second ratio), an interpolation frame can be generated by using motion compensation only if a dominant motion is present in the frame, and motion compensation is not executed if no dominant motion is present in the frame. Thereby, the frame interpolation process with high efficiency can be executed.

The frame output module 36 outputs to the outside the interpolation frame that has been input from the interpolation frame generation module 35.

The previous interpolation process memory 23 stores, for the parameters of the motion vector search module 32 in the next frame interpolation process, the motion vector map which has been calculated by the motion vector search module 32, and the first to n-th major vectors which have been detected by the major vector detection module 33.

Next, an example of the operation of the computer 10 according to the embodiment is described.

Figure 7:
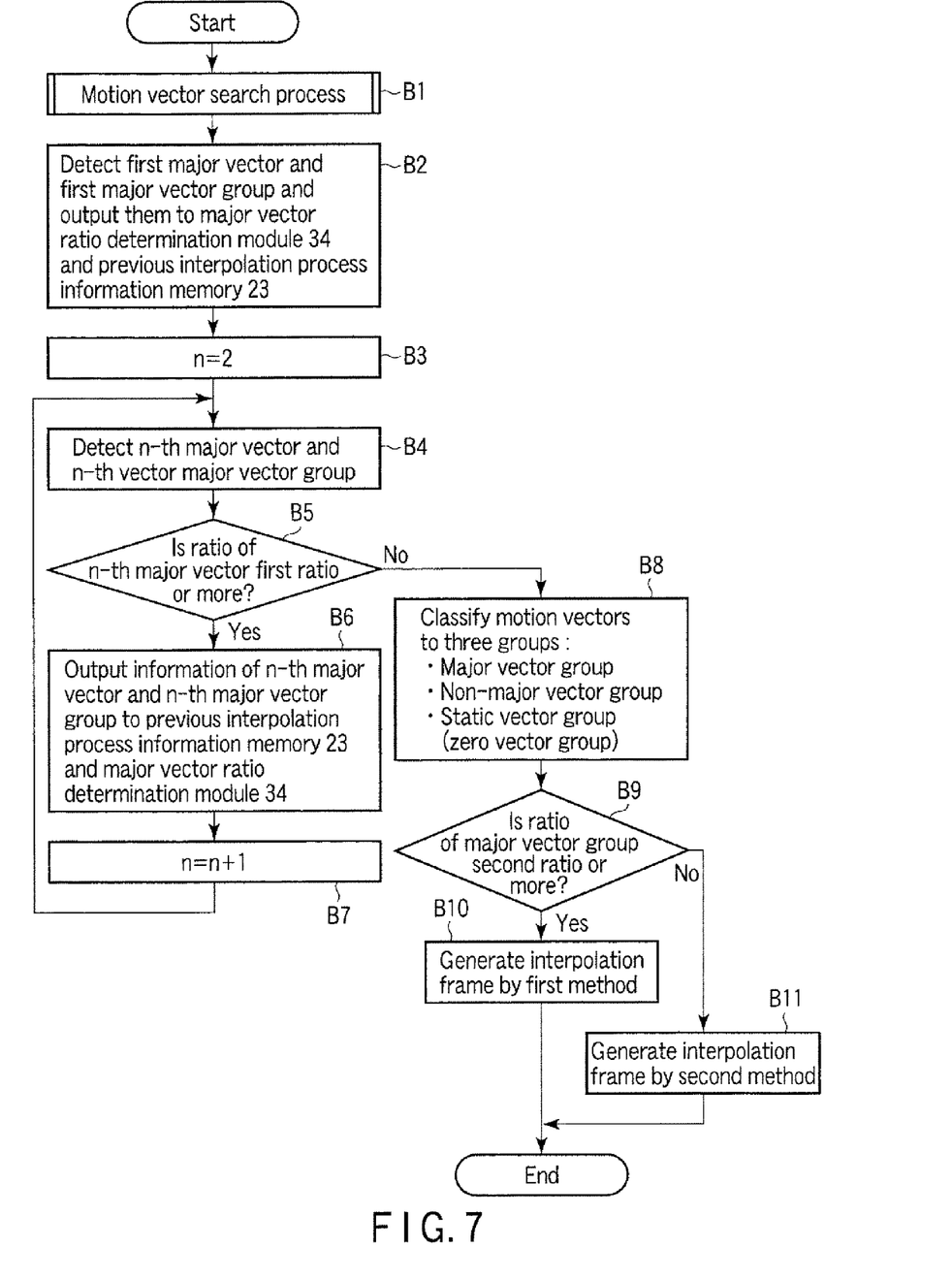
FIG. 7 is an exemplary flowchart illustrating the procedure of an interpolation frame generation processing using the distribution of motion vectors executed by the image processing apparatus of the embodiment.

FIG. 7 is a flowchart illustrating the procedure of the process, which is executed by the main controller 22 of the computer 10, for improving the motion vector estimation precision and improving the image quality of the interpolation frame that is generated, by using the distribution of motion vectors. In FIG. 7, reference numerals beginning with character "B" designate the blocks of the flowchart.

In this procedure, at the time of start, two successive image frames are input from the frame input module 31.

To begin with, the motion vector search module 32 executes the motion vector search process (block B1). The motion vector search process is a process of searching for a motion vector in units of a predetermined pixel block (e.g. 8 pixels×8 pixels) with respect to the two successive image frames that are input from the frame input module 31, and generating a motion vector map. The motion vector search module 32 outputs the information of the generated motion vector map to the major vector detection module 33, the interpolation frame generation module 35 and the previous interpolation process memory 23. The previous interpolation process memory 23 stores the input information of the motion vector map.

Subsequently, the major vector detection module 33 extracts the first major vector and first major vector group from the motion vector map, outputs the information of the first major vector to the previous interpolation process memory 23, and outputs the information of the first major vector group to the major vector ratio determination module 34 (block B2). The first major vector represents motion vectors with the same direction and the same magnitude which have the ratio of the number of pixel blocks corresponding the motion vectors with the same direction and the same magnitude to the number of pixel blocks of one frame, the ratio being the highest (see the left part of FIG. 4). The first major vector group is a vector group including the first major vector and a similar motion vector or vectors having a correlation value with the first major vector, which is greater than or equal to a predetermined value.

Subsequently, the major vector detection module 33 substitutes 2 for a variable n (block B3). The value of this variable is stored, for example, in a predetermined work area in the RAM 223 of the main controller 22.

Next, the major vector detection module 33 detects, as an n-th major vector, motion vectors excluding the (n−1)th major vector group and having the same direction and the same magnitude which have the ratio of the number of pixel blocks corresponding to the motion vectors with the same direction and the same magnitude to the number of pixel blocks of one frame, the ratio being the highest (block B4). In addition, the major vector detection module 33 extracts an n-th major vector group including the n-th major vector and a motion vector or vectors (similar motion vector or vectors) having a correlation value with the n-th major vector, which is greater than or equal to a predetermined value.

Next, the major vector detection module 33 determines whether the ratio of the number of pixel blocks corresponding to motion vectors with the same direction and the same magnitude as the n-th major vector to the number of pixel blocks included in one frame is greater than or equal to the first ratio (e.g. 0.05) (block B5).

If this ratio is greater than or equal to the first ratio (YES in block B5), the major vector detection module 33 outputs the information of the n-th major vector to the previous interpolation process memory 23, and outputs the information of the n-th major vector group to the major vector ratio determination module 34 (block B6). The major vector detection module 33 adds 1 to the variable n (block B7), and returns to block B4 to detect the major vector once again.

On the other hand, if the ratio is less than the first ratio (NO in block B5), the major vector detection module 33 classifies the motion vectors into three groups: the major vector group comprising vector groups including the first vector group, the non-major vector group comprising motion vectors which are not zero vectors and do not belong to the major vector group, and the static vector group comprising motion vectors that are zero vectors (block B8).

The major vector ratio determination module 34 determines whether the major vector group ratio is greater than or equal to the second ratio (e.g. 0.5) (block B9). if the major vector group ratio is greater than or equal to the second ratio, the process advances to block B10. On the other hand, if the major vector group ratio is less than the second ratio, the process advances to block B11.

If the major vector group ratio is greater than or equal to the second ratio (YES in block B9), the interpolation frame generation module 35 generates an interpolation frame by the first method (block B10). Specifically, the interpolation frame generation module 35 generates an interpolation frame inserted between two input image frames by using motion compensation based on the motion vector map which is received from the motion vector search module 32. The interpolation frame generation module 35 outputs the interpolation frame to the frame output module 36, and the series of procedures is completed.

On the other hand, if the major vector group ratio is less than the second ratio (NO in block B9), the interpolation frame generation module 35 generates an interpolation frame by the second method (block B11). Specifically, the interpolation frame generation module 35 executes one of the process in which a frame, which is obtained by copying any one of input frames, is generated as an interpolation frame, the process in which an interpolation frame is generated by averaging pixel values of two input frames, and the process in which no interpolation frame is generated.

By the above-described procedure, the motion estimation precision when generating the interpolation frame can be improved by using the distribution of motion vectors. The reason for this is that the information of the major vector, which is stored in the previous interpolation process memory 23 in block B2 and block B6, is obtained based on the distribution of motion vectors, and this major vector is used as one of candidates for the search center vector in the motion vector search in block B1.

In addition, by switching the interpolation frame generation method based on the distribution of motion vectors, the frame interpolation by the motion compensation is executed only if the effect of the frame interpolation by the motion compensation is high. Thereby, the processing cost that is necessary for the interpolation frame generation can be reduced, and the image quality of the generated interpolation frame can be improved.

Next, a description is given of the procedure of the process of searching for motion vectors by using the information of the major vector which is stored in the previous interpolation process memory 23.

Figure 8:
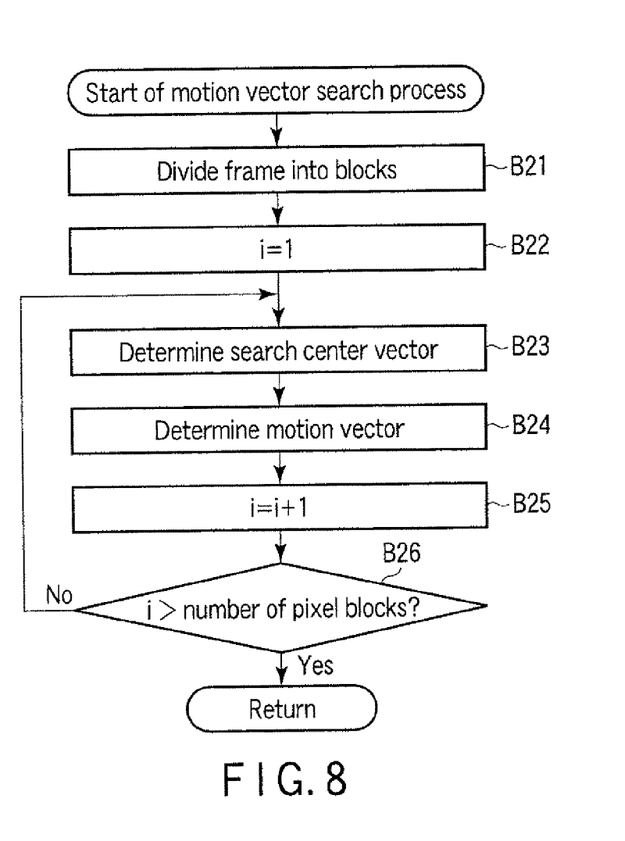
FIG. 8 is an exemplary sub-routine flowchart illustrating the procedure of a motion vector search processing in the interpolation frame generation processing by the image processing apparatus of the embodiment.

FIG. 8 is a sub-routine flowchart illustrating the procedure of the motion vector search process which is executed by the main controller 22 in block B1 in FIG. 7. In FIG. 8, reference numerals beginning with character "B" designate the blocks of the flowchart.

To start with, the motion vector search module 32 divides each of two input image frames into predetermined pixel blocks (e.g. 8 pixels×8 pixels) (block B21). In the description below, each of the divided pixel blocks is referred to as "pixel block Bi" by using a variable i (i is an integer between 1 and m, m is the number of the pixel blocks (block number)).

Subsequently, the motion vector search module 32 substitutes "1" for the variable i (block B22). The value of the variable is stored, for example, in a predetermined work area in the RAM 223 of the main controller 22.

The motion vector search module 32 executes block matching of the pixel block Bi using each of the candidate vectors for a search center vector (hereinafter referred to as "search center vector candidate") in the motion vector search, thereby calculating a matching value and determining the search center vector which is used for the motion vector search (block B23).

Figure 9:
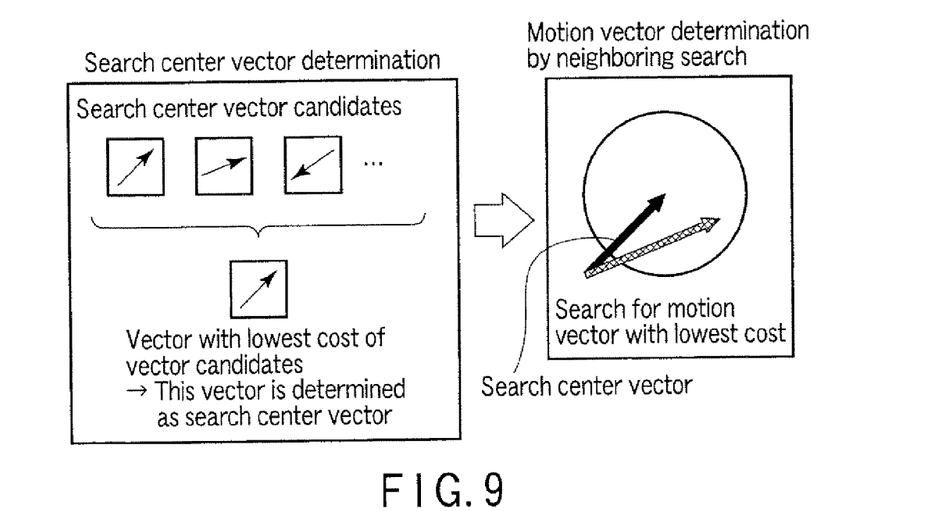
FIG. 9 is an exemplary view showing an example of a motion vector search by a motion vector search module.
Figure 10:
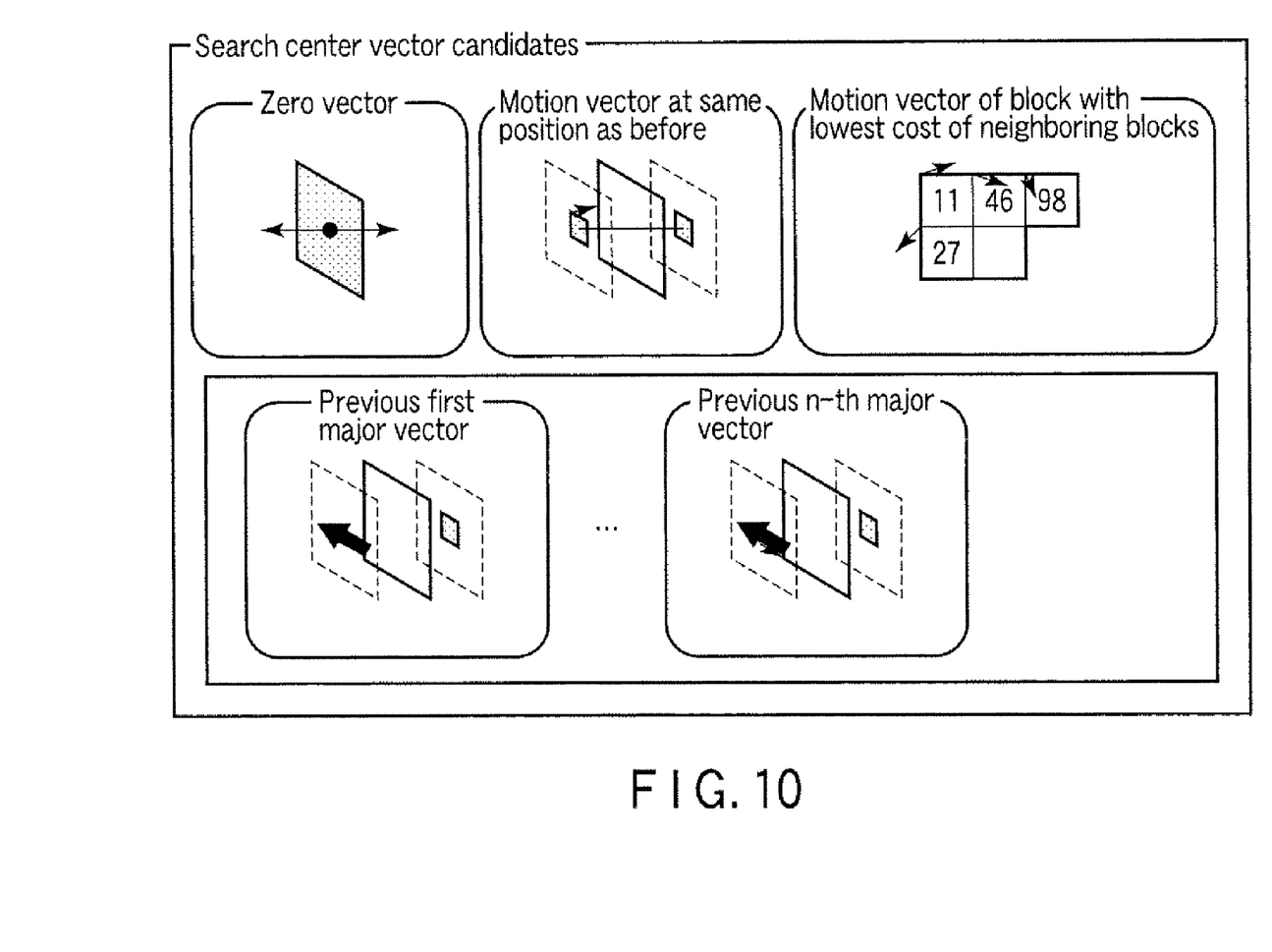
FIG. 10 is an exemplary view showing examples of the candidate vector for a search center vector in the motion vector search.

FIG. 9 shows an example of searching a motion vector search by the motion vector search module 32. FIG. 10 shows examples of the search center vector candidate.

The motion vector search module 32 calculates a matching value (matching cost), for example, between a pixel block Bi in the second image frame and a pixel block in the first image frame which corresponds to a position that is designated by a motion vector of a search center vector candidate, with a starting point being set at the pixel block Bi in the second image frame. As the matching value, use is made of, for instance, a sum of absolute difference (SAD) of luminance or a sum of squared difference (SSD) of luminance. The motion vector search module 32 determines a search center vector candidate with a lowest matching value (with a lowest matching cost) to be the search center vector.

As shown in FIG. 10, in the embodiment, the search center vector candidates include previous major vector or vectors (first major vector to n-th major vector) which are stored in the previous interpolation process memory 23. In other words, a major vector or vectors, which have been extracted in a previous frame interpolation process, are used as a search center vector candidate. In FIG. 10, the "Motion vector of pixel block with lowest cost of neighboring pixel blocks" means a motion vector of a pixel block with a minimum matching value with respect to a pixel block Bi, among neighboring pixel blocks for which a motion vector search has already been finished by, e.g. a raster order.

There is a good possibility that moving picture data has a high correlation between successive image frames. Accordingly, there is a high probability that a similar motion to the motion between temporally preceding frames is present between current frames. Therefore, by adding the previous major vectors to the search center vector candidates of motion vectors, the motion estimation precision can be enhanced.

Subsequently, the motion vector search module 32 searches for the search area which is designated by the determined search center vector, and determines the motion vector (block 224). Specifically, the motion vector search module 32 calculates a matching cost between a pixel block Bi in the second image frame and a pixel block that is included in the search area around the pixel block in the first image frame, which is designated by a search center vector with a starting point being set at the pixel block Bi. The motion vector search module 32 determines, as the motion vector of the pixel block Bi, the vector from the pixel block with the lowest matching cost to the pixel block Bi (see a right part of FIG. 9).

Next, the motion vector search module 32 adds "1" to the variable i, which is stored, for example, in a predetermined work area in the RAM 223 of the main controller 22 (block B25).

The motion vector search module 32 then determines whether the variable i is greater than the pixel block number m (block B26). If the variable i is not greater than the pixel block number m (NO in block B26), the motion vector search module 32 returns to block B23 in order to calculate the motion vector of a subsequent pixel block. On the other hand, if the variable i is greater than the pixel block number m (YES in block B26), the motion vectors of all pixel blocks have been calculated and the motion vector map has been completed. Thus, the motion vector search module 32 outputs the information of the motion vector map to the major vector detection module 33 and interpolation frame generation module 35, and stores the information of this motion vector map in the previous interpolation process memory 23, and the process procedure returns to block B2 in FIG. 7.

By the above-described procedure, the motion vectors can be searched for, with use of the information of the major vector which is stored in the previous interpolation process memory 23.

When searching for the motion vectors, the computer 10 according to the embodiment uses the motion vector map which is calculated by the motion vector search in the previous frame interpolation process, and the information of the major vector or vectors which are extracted based on the distribution of motion vectors. There is a good possibility that moving picture data has a high correlation between successive image frames. Accordingly, there is a high probability that a similar motion to the motion between temporally preceding frames is present between current frames. Therefore, the computer 10 of the embodiment, with use of the distribution of motion vectors, can enhance the motion vector estimation precision and can improve the image quality of the interpolation frame.

The computer 10 of the embodiment uses the determination by the major vector ratio determination module 34 (the determination as to whether the major vector group ratio is the second ratio or more). Thereby, the computer 10 generates an interpolation frame by using motion compensation only if a dominant motion is present in the frame, and does not execute motion compensation if no dominant motion is present in the frame. Therefore, according to the computer 10 of the embodiment, a problem because of a motion estimation error can be avoided, and a frame interpolation process with high efficiency can be executed.

In the meantime, as regards the previous interpolation process memory 23 in the embodiment, a memory area may be provided, for example, in the RAM 223, and the information relating to the motion vector map and major vector may be stored in this memory area.

The present invention is applicable to various information processing apparatuses in which successive image frames are usable, for instance, a TV receiver and a recording/playback apparatus, as well as personal computers such as the notebook personal computer that has been described in the embodiment of the invention.

In the process exemplified in the embodiment of the invention, the blocks of the flowchart are time-sequentially executed in the described order. However, the blocks of the flowchart may not necessarily be executed in the time-sequential manner, and the blocks may be executed in parallel or individually.

All the procedure of the frame interpolation process according to the present embodiment may be executed by software. Thus, the same advantageous effects as with the present embodiment can easily be obtained simply by installing a program, which carries out the procedure of the frame interpolation process, into an ordinary computer through a computer-readable storage medium.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A moving picture reproduction apparatus comprising:
a motion vector search module configured to search for motion vectors between input moving picture frames with respect to predetermined pixel blocks;
a major vector detection module configured to detect a first major vector which is a motion vector included among the motion vectors searched for and has a maximal ratio of the number of blocks corresponding to one kind of motion vector to the number of all blocks included in one of the moving picture frames, and to classify a motion vector whose absolute value of difference between the motion vector and the first major vector is a predetermined value or less as a first major vector group together with the first major vector,
the major vector detection module being configured to detect a second major vector which is a motion vector included among motion vectors obtained by removing the first major vector group from the motion vectors searched for and whose ratio is a first ratio or more, and to classify a motion vector whose absolute value of difference between the motion vector and the second major vector is the predetermined value or less as a second major vector group together with the second major vector,
the major vector detection module being configured to repeat detection and classification in order to detect a plurality of major vectors and classify the motion vectors searched for into a plurality of vector groups;
a determination module configured to determine a method in which interpolation frames to be inserted between the moving picture frames are generated; and
an interpolation frame generation module configured to generate interpolation frames in the method determined by the determination module,
wherein the major vector detection module is configured to classify the motion vectors searched for by the motion vector search module into a major vector group comprising the first major vector group, a non-major vector group comprising motion vectors which are other than zero vectors and not included in the major vector group, and a static vector group comprising motion vectors that are zero vectors;
the determination module is configured to determine that the interpolation frame generation module should generate interpolation frames in a first method when a ratio of the number of motion vectors constituting the major vector group to the number of motion vectors constituting both the major vector group and the non-major vector group is a second ratio or more, and to determine that the interpolation frame generation module should generate interpolation frames in a second method when the ratio is less than the second ratio; and
the motion vector search module is configured to use, as candidates for a search center vector, major vectors which is detected by the major vector detection module from moving picture frames that are input last, and which include the first major vector, to determine one of the candidates that has a lowest matching value as a candidate center vector, and to search an area around the candidate center vector for a motion vector that has a minimum matching value when the motion vectors are searched for with respect to the predetermined pixel blocks.

2. The moving picture reproduction apparatus of claim 1, wherein the major vector detection module is configured to classify the motion vectors searched for by the motion vector search module into a major vector group comprising the vector groups, a non-major vector group comprising motion vectors which are other than zero vectors and not included in the major vector group, and a static vector group comprising motion vectors that are zero vectors.

3. The moving picture reproduction apparatus of claim 2, wherein the first method for generation of interpolation frames is a method in which interpolation frames to be inserted between the moving picture frames are generated by performing motion compensation based on the motion vectors searched for by the motion vector search module, and
the second method for generation of interpolation frames comprises a method in which interpolation frame is generated.

4. The moving picture reproduction apparatus of claim 3, further comprising:
a display module configured to display the interpolation frames.

5. The moving picture reproduction apparatus of claim 2, further comprising:
a display module configured to display the interpolation frames.

6. The moving picture reproduction apparatus of claim 1, further comprising:
a display module configured to display the interpolation frames.

7. A moving picture reproduction method comprising:
searching for motion vectors between input moving picture frames with respect to predetermined pixel blocks;
detecting major vectors including a first major vector by:
detecting the first major vector which is a motion vector included among the motion vectors searched for and has a maximal ratio of the number of blocks corresponding to one kind of motion vector to the number of all blocks included in one of the moving picture frames; and
detecting, as a major vector, another motion vector wherein the ratio is a first ratio or more;
determining a method in which interpolation frames to be inserted between the moving picture frames are generated; and generating the interpolation frames in the method determined by the determining, wherein the detecting major vectors including a first major vector comprises:

detecting major vectors and classifying the motion vectors searched for into vector groups by repeating: detecting the first major vector; classifying a motion vector whose absolute value of difference between the motion vector and the first major vector is a predetermined value or less as a first major vector group together with the first major vector; detecting a second major vector which is a motion vector included among motion vectors obtaining by removing the first major vector group from the motion vectors searched for and in which a ratio of the number of blocks corresponding to one kind of motion vector to the number of all blocks included in one of the moving picture frames is the first ratio or more, and classifying a motion vector whose absolute value determined with respect to the second major vector is the predetermined value or less as a second major vector group together with the second major vector, and classifying the motion vectors searched for into a major vector group comprising the first major vector group, a non-major group comprising motion vectors which are other than zero vectors and not included in the major vector group, and a static vector group comprising motion vectors that are zero vectors;

the determining comprises determining that the interpolation frames should be generated in a first method when a ratio of the number of motion vectors constituting the major vector group to the number of motion vectors constituting both the major vector group and the non-major vector group is a second ratio or more, and determining that interpolation frames should be generated in a second method when the ratio is less than the second ratio; and the searching for the motion vectors comprises:

using, as candidates for a search center vector, major vectors including the first major vector detected with respect to the moving picture frames that are input last, when the motion pictures are searched for with respect to the predetermined number of pixel blocks;

determining one of the candidates that has a lowest matching value as a candidate center vector; and searching an area around the candidate center vector for a motion vector that has a minimum matching value.

8. The moving picture reproduction method of claim 7, wherein the detecting major vectors including a first major vector comprises:

detecting major vectors and classifying the motion vectors searched for into a plurality of vector groups by repeating: detecting a first major vector; classifying a motion vector whose absolute value determined with respect to the first major vector is the predetermined value or less as a first major vector group together with the first major vector; detecting a second major vector which is a motion vector included among motion vectors obtaining by removing the first major vector group from the motion vectors searched for and in which a ratio of the number of blocks corresponding to one kind of motion vector to the number of all blocks included in one of the moving picture frames is the first ratio or more; and classifying a motion vector whose absolute value determined with respect to the second major vector is the predetermined value or less as a second major vector group together with the second major vector; and classifying the motion vectors searched for into a major vector group comprising the vector groups, a non-major group comprising motion vectors which are other than zero vectors and not included in the major vector group, and a static vector group comprising motion vectors that are zero vectors.

9. A non-transitory computer readable medium having a computer program stored thereon that is executable by a computer to control the computer to execute functions of:

searching for motion vectors between a plurality of input moving picture frames with respect to a predetermined number of pixel blocks;

detecting major vectors including a first major vectors by: detecting the first major vector which is a motion vector included among the motion vectors searched for and has a maximal ratio of the number of blocks corresponding to one kind of motion vector to the number of all blocks included in one of the moving picture frames; and detecting, as a major vector, another motion vector wherein the ratio is a first ratio or more;

determining a method in which interpolation frames to be inserted between the moving picture frames are generated; and generating the interpolation frames in the method determined by the determining, wherein the detecting major vectors including a first major vector comprises:

detecting major vectors and classifying the motion vectors searched for into a plurality of vector groups by repeating: detecting the first major vector; classifying a motion vector whose absolute value determined with respect to the first major vector is a predetermined value or less as a first major vector group together with the first major vector; detecting a second major vector which is a motion vector included among motion vectors obtaining by removing the first major vector group from the motion vectors searched for and in which a ratio of the number of blocks corresponding to one kind of motion vector to the number of all blocks included in one of the moving picture frames is the first ratio or more, and classifying a motion vector whose absolute value determined with respect to the second major vector is the predetermined value or less as a second major vector group together with the second major vector; and classifying the motion vectors searched for into a major vector group comprising the first major vector group, a non-major group comprising motion vectors which are other than zero vectors and not included in the major vector group, and a static vector group comprising motion vectors that are zero vectors;

the determining comprises determining that the interpolation frames should be generated in a first method when a ratio of the number of motion vectors constituting the major vector group to the number of motion vectors constituting both the major vector group and the non-major vector group is a second ratio or more, and determining that interpolation frames should be generated in a second method when the ratio is less than the second ratio; and the searching for the motion vectors comprises:

using, as candidates for a search center vector, major vectors including a first major vector detected with respect to the moving picture frames that are input last, when the motion pictures are searched for with respect to the predetermined number of pixel blocks;

determining one of the candidates that has a lowest matching value as a candidate center vector; and searching an area around the candidate center vector for a motion vector that has a minimum matching value.

10. The non-transitory computer readable medium of claim 9, wherein the detecting major vectors including a first major vector comprises:

detecting major vectors and classifying the motion vectors searched for into a plurality of vector groups by repeating: detecting a first major vector; classifying a motion vector whose absolute value determined with respect to the first major vector is the predetermined value or less as a first major vector group together with the first major vector; detecting a second major vector which is a motion vector included among motion vectors obtaining by removing the first major vector group from the motion vectors searched for and in which a ratio of the number of blocks corresponding to one kind of motion vector to the number of all blocks included in one of the moving picture frames is the first ratio or more; and classifying a motion vector whose absolute value determined with respect to the second major vector is the predetermined value or less as a second major vector group together with the second major vector; and classifying the motion vectors searched for into a major vector group comprising the vector groups, a non-major group comprising motion vectors which are other than zero vectors and not included in the major vector group, and a static vector group comprising motion vectors that are zero vectors.

* * * * *